United States Patent [19]
Bartlett et al.

[11] 4,021,996
[45] May 10, 1977

[54] GOLF GREENS MOWER

[76] Inventors: Gordon E. Bartlett, 1604-½ Laurel Ave.; Michael D. Roach, Rte. 5, Box 126, both of Eau Claire, Wis. 54701

[22] Filed: Feb. 26, 1976

[21] Appl. No.: 661,696

[52] U.S. Cl. .................................... 56/7; 56/17.2; 56/249

[51] Int. Cl.² ........................................ A01D 55/28

[58] Field of Search ............. 56/7, 249, 13.6, 17.1, 56/17.2, 11.9, DIG. 11

[56] References Cited
UNITED STATES PATENTS

| | | | |
|---|---|---|---|
| 3,524,309 | 8/1970 | Bartlett | 56/249 |
| 3,824,772 | 7/1974 | Sorenson et al. | 56/7 |

*Primary Examiner*—J.N. Eskovitz
*Attorney, Agent, or Firm*—Burd, Braddock & Bartz

[57] ABSTRACT

A precision grass mower of the triplex reel type operating from a common tractor-type power source, each mower unit having an adjustable ground engaging roller for cutting golf greens at a precisely predetermined height. Each of the reels of the mower is provided with manually actuated, automatically operated shifting means for moving the height adjusting roller to either of two positions for cutting the grass of the green and of the collar surrounding the green at different but precisely determined heights. The shifting means of all of the mower reels are instantly and simultaneously actuated and operated by fluid pressure.

8 Claims, 6 Drawing Figures

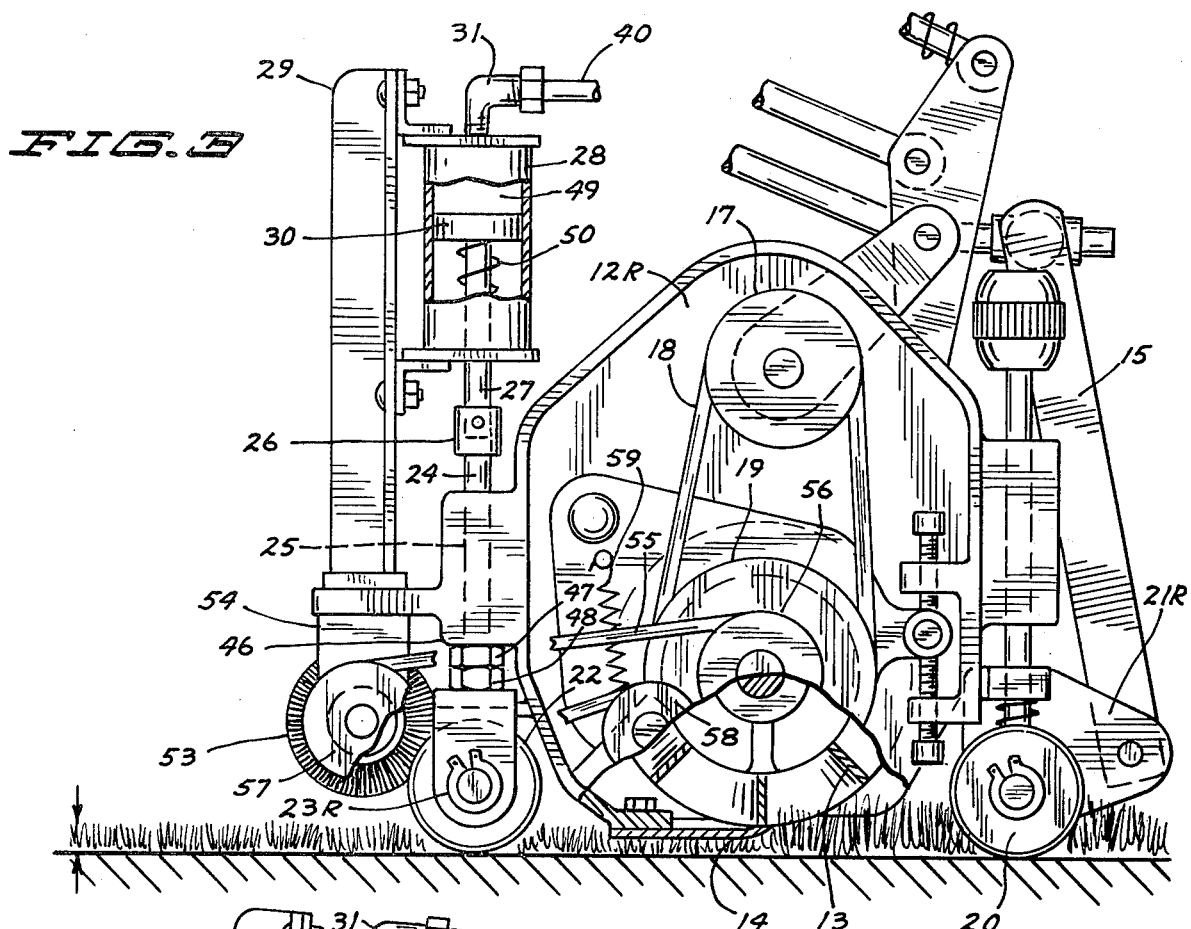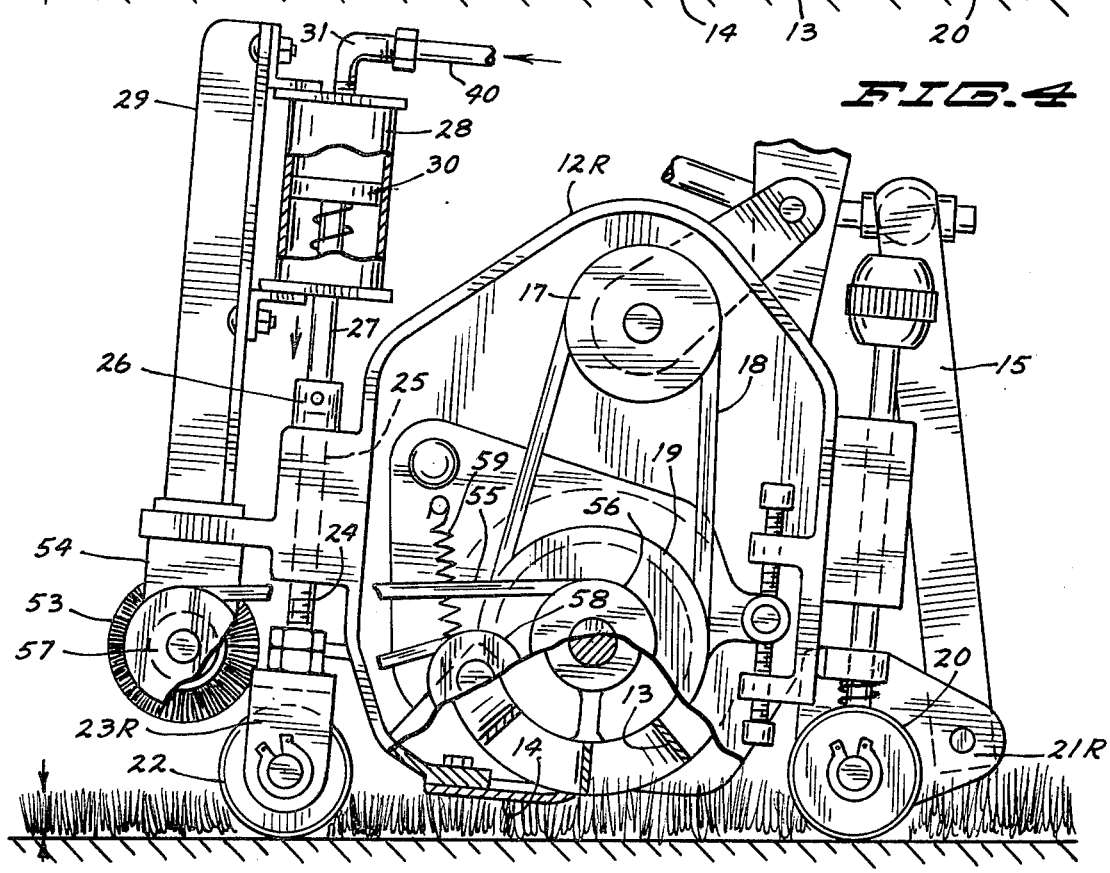

GOLF GREENS MOWER

This invention relates to a precision two-step cutting adjustment for multiple reel power-driven lawn mowers such as are employed in mowing the putting greens and collars surrounding the putting greens of golf courses, and similar uses where the finest and most accurate type of mowing is required. As is well known, the grass on golf putting greens is thick and is maintained closely cropped. In most instances, this requires almost daily mowing. The greens mower is a precision instrument for accurate close mowing of the grass.

Most greenskeepers prefer for the collar grass surrounding the putting green for a distance of two or three mower widths to be precisely and accurately cut, but at a height slightly greater than that of the putting green, such as one-fourth to one-half inch greater. Because of the required precision setting of the cutting height of both putting green and collar mowers, adjusting of the cutting height on the course so as to mow both putting green and collar with the same mower could in the past be accomplished only with great difficulty. For that reason, two mowers were commonly used, each with its own precision height adjustment. Each golf course was faced with the alternative of having a less than ideal playing surface or the added expense of maintaining an extra mower for cutting the collars of putting greens.

Several years ago one of the present applicants solved this problem with the development of shifting means for moving the height adjusting roller of a walking push type reel greens mower to either of two positions for cutting grass at different but precisely determined heights. That improved mower is the subject of U.S. Pat. No. 3,524,309, issued Aug. 18, 1970 to Gordon E. Bartlett. While the golf greens mower described in that patent proved to be effective, push-type greens mowers have been largely superseded by tractor-type riding power-driven mowers having a plurality of reel cutters, usually three. These so-called triplex mowers generally have removable cutting reel units so that other interchangeable turf treating implements may be substituted, installed in generally the same manner and driven from the same power unit.

The same problems exists with respect to precision adjustment of the grass cutting height for golf green and collar. Although most golf green mowers of the triplex type have been provided with height adjusting means, they have not found favor with greenskeepers because they are manually operable and each reel must be individually shifted. This requires the operator stopping the mower, dismounting, separately adjusting the height of each mower reel, remounting and restarting. This must be done repeatedly as the operator moves from green to collar to the next green, etc. As a result, the adjustment is usually not made and the playing surface is less than ideal.

The present invention is directed to rectifying of this problem by providing each mower reel with fluid operated shifting means which can be actuated instantly and simultaneously by the operator without need for dismounting from the mower, or even stopping the mower. The existing power-driven triplex putting green mowers now in widespread use include a plurality of separate mower units each including a reel and bed plate, a rearwardly disposed ground engaging roller or drum, and a forwardly disposed ground engaging roller or drum, all rotatable about parallel axes. One or the other of the ground engaging rollers is adjustable for regulating the mowing height, depending upon the particular manufacturer of the mower. The automatic height adjusting means according to the present invention is adapted for modification of the existing mowers of either type of whatever manufacturer, i.e., Hahn, Toro or Jacobsen.

The invention is illustrated in the accompanying drawings in which the same numerals refer to corresponding parts and in which:

FIG. 3 is a side elevation, partly broken away, showing the reel at one cutting height;

FIG. 4 is a similar side elevation showing the reel at a higher cutting height;

Figure 1:
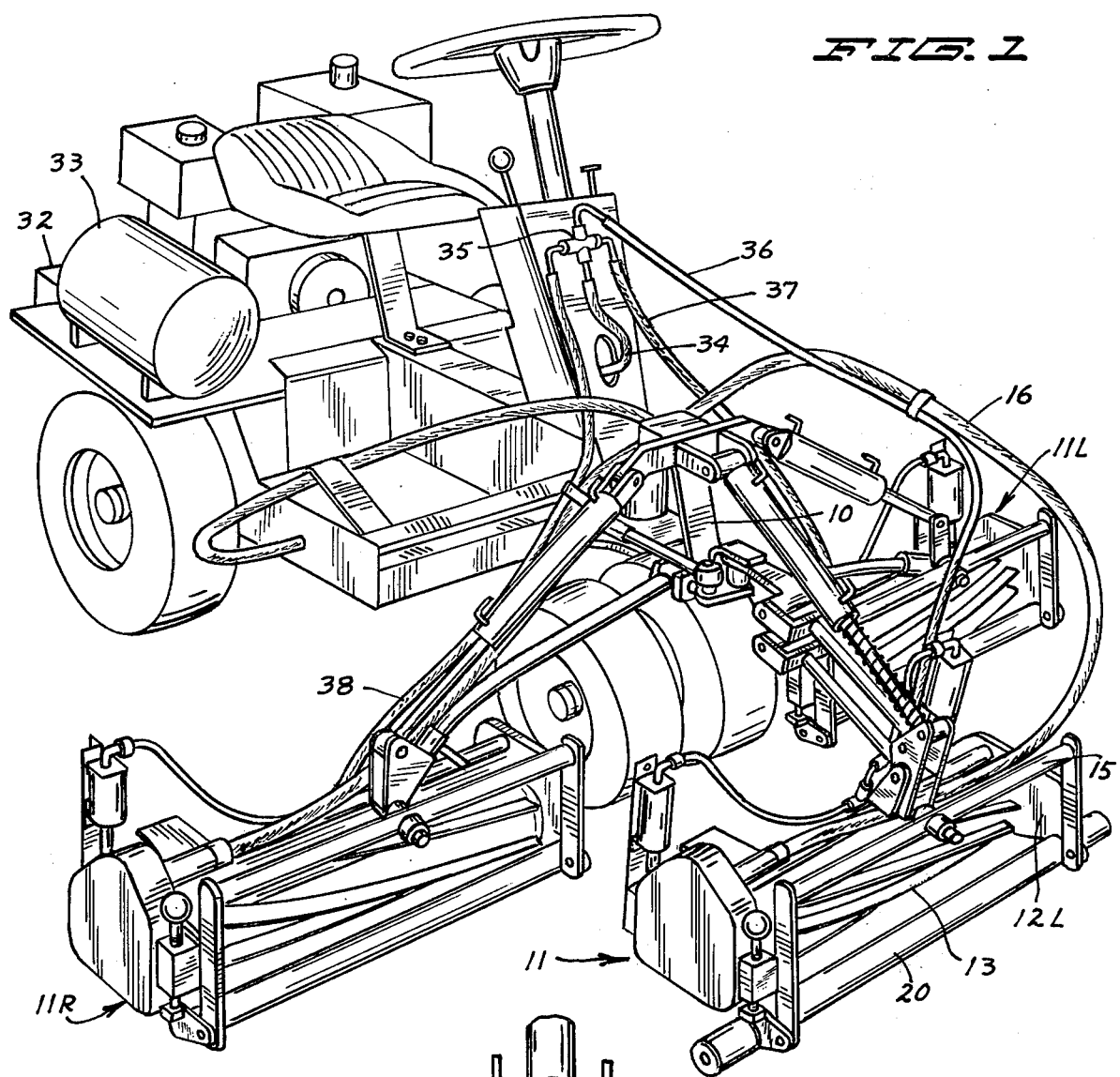
FIG. 1 is a perspective view of a typical power-driven triplex golf greens mower.
Figure 2:
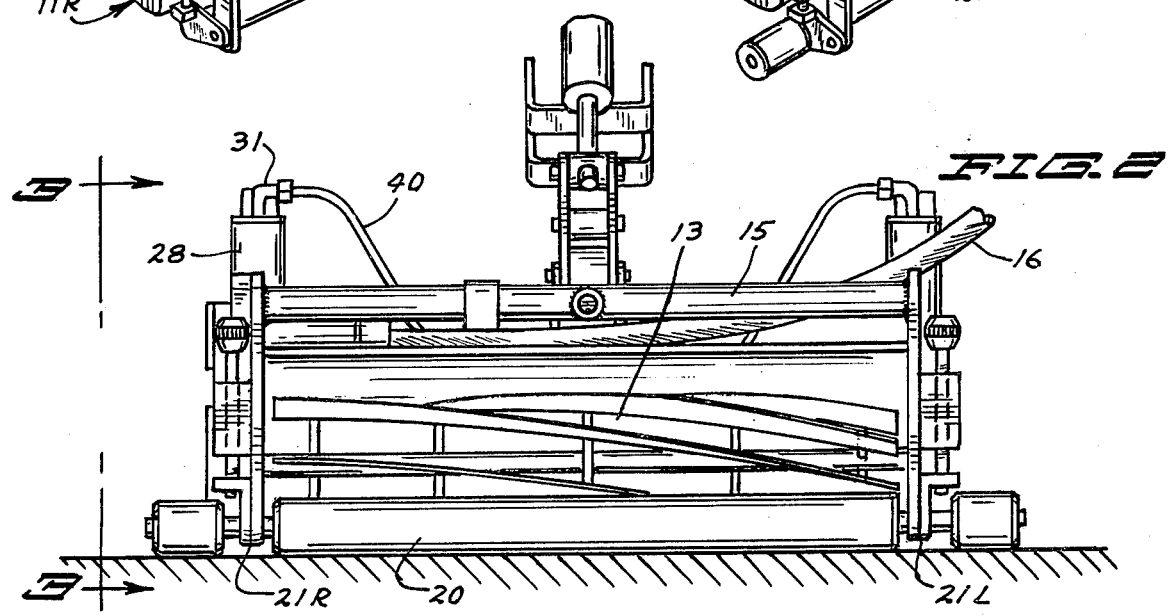
FIG. 2 is a front elevation of one of the reel mower units.

Referring now to the drawings, and particularly to FIG. 1, there is shown a typical power-driven riding tractor-type triplex golf greens mower. The basic tractor unit, whose structure per se forms no part of the present invention, comprises, as is well understood, a frame, widely spaced apart rear ground engaging wheels, and, for steering, a pair of closely spaced apart forward ground engaging wheels operable through a steering column by a steering wheel by an operator sitting on a seat mounted upon the frame. The usual motor, power take-off, operating controls, steering means, and the like, are provided.

A bracket 10 is mounted on the forward end of the frame of the tractor unit for supporting a plurality of reel type mowing units indicated generally at 11, 11R and 11L, all of which have the same basic structure. Each of the reel units is pivotally supported from an arm extending from bracket 10 and, as is well known, hydraulic cylinders are provided to raise the mower units during travel from green to green and to lower the mower units for cutting. To avoid unnecessarily obscuring the drawing, the fluid lines leading to the cylinders are omitted. (For details as to structure and assembly of one form of basic power drive unit, reference may be had to Hahn Tournament II Owners Manual and Parts List, Forms No. 343625-6, Hahn, Inc., Turf Products Division, Evansville, IND.)

Each mower unit includes a pair of spaced apart parallel, longitudinally extending vertical end frame members 12L and 12R which support a transversely extending grass cutting reel 13 journaled in suitable bearings in the end members and a bed plate 14 (FIGS. 3 and 4). The frame is connected to the power unit through a transversely extending mower mounting tube assembly 15 pivotally attached to the forward ends of the spaced apart frame members 12L and 12R. The reel 13 is driven by a rotating cable drive 16 from the tractor power unit through sheave 17, belt 18 and sheave 19. Apart from the modification according to the present invention, the structure per se of the mower unit is not part of the invention. Although varying the details, the greens mowing units of the several manufacturers share the same basic structure. (For details of structure and operation of one form of available mowing unit, reference may be had to the Hahn Tournament Greens Reels Owners Manual and Parts List, Forms No. 343551-2, Hahn, Inc.)

A forward transversely extending ground engaging roller 20 is journaled in mounting brackets 21L and 21R adjustably, but fixedly, secured to the forward ends of frame side members 12L and 12R. A rear transversely extending ground engaging roller 22 is journaled for rotation in a pair of roller support assemblies 23L and 23R. The axes of rotation of reel 13 and rollers 20 and 22 are parallel. Each roller assembly 23 includes a vertically reciprocal threaded rod-like shaft or shank 24 which extends upwardly through a sleeve bushing in a generally vertical passage 25 housed in the rearward edge of each frame end member 12L and 12R.

According to the present invention, the top end of shank 24 is secured, as by means of collar or sleeve 26, to the piston rod 27 of a cylinder 28, the shank and piston rod being in axial alignment. Each cylinder 28 is fixedly supported from a bracket 29 fixedly mounted adjacent the rear edges of mower frame end members 12L and 12R. Cylinders 28 are fluid actuated, preferably by air introduced to the top of the cylinder above piston 30 through fitting 31.

Figure 5:
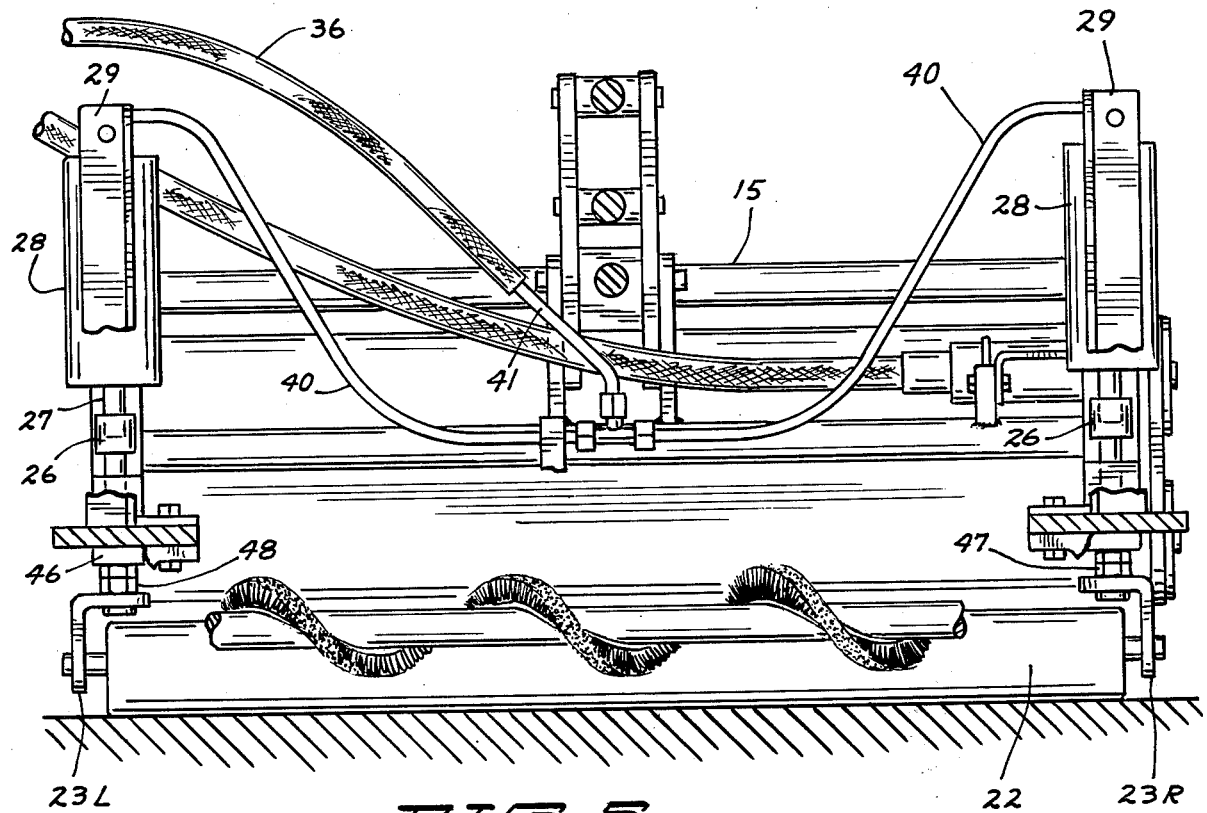
FIG. 5 is a rear elevation of a mowing unit.

An air compressor 32 and air tank 33 are mounted on the vehicle frame and connected by a tube or hose 34 to a four-way distributor fitting 35 mounted for convenience on the front of the steering column of the tractor. From fitting 35, other flexible conduits, such as tubes or hoses 36, 37 and 38, extend to the reel units 11, 11L and 11R, respectively, for uniform distribution of pressure. On each reel unit there is mounted in turn a T-fitting 39 from which tubes or hoses 40 extend to the cylinders 28 mounted on the opposite sides of each mower unit. Preferably, as best seen in FIG. 5, the flexible ducts 36, 37 and 38 are flexible hoses which are connected to a short length of rigid tubing 41 which is brazed or soldered or otherwise permanently affixed to fitting 39. This is for the purpose of permitting ready engagement and disengagement of the fluid drive system when the mower units are interchangeable with other turf treating implements.

Figure 6:
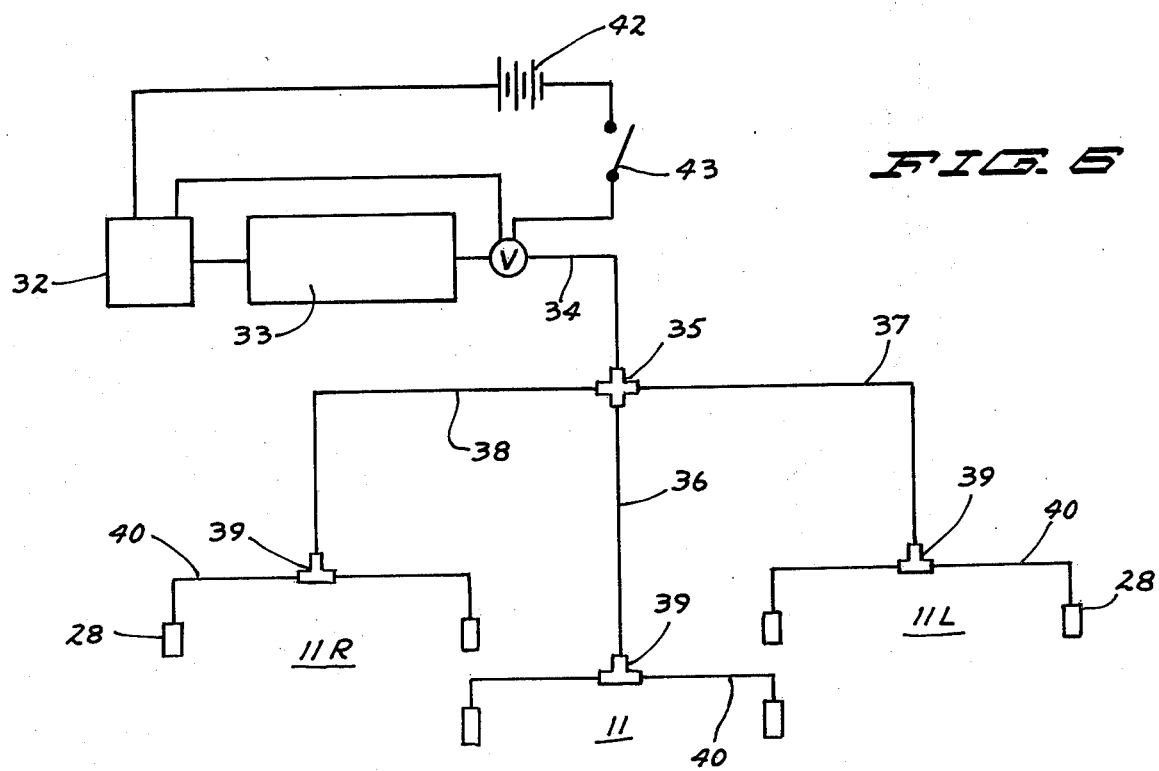
FIG. 6 is a schematic diagram of the fluid system by which the shifting mechanism is operated.

The fluid drive system is shown schematically in FIG. 6. The compressor 32 is driven from the vehicle storage battery 42. An on-off switch 43 is mounted on the operator's side of the steering column of the vehicle. The cylinders are actuated and deactuated by a simple flip of the switch. The switch energizes the circuit operating the motor of the compressor and activates a solenoid valve controlling release of compressed air from the tank. The compressor operates as needed to maintain pressure. Although air is the preferred fluid medium to operate the cylinders, a hydraulic fluid may obviously be used. Moderate air pressure between about 25 and 50 psi has been found to be sufficient to operate all of the cylinders instantly, smoothly, and simultaneously.

When the mower is at greens cutting height, as shown in FIG. 3, the heel or shoulder 46 of the rearward end of the frame side members 12L and 12R rest upon a screw nut 47 which functions as a stop for positioning the roller mounts 23 and roller 22 in their normal or uppermost positions. A second nut 48 is desirably provided to lock nut 47 in position. When fluid is introduced into chamber 49 of cylinder 28 above piston 30, the piston is forced downwardly against the tension of spring 50 forcing piston rod 27 to be extended farther from the cylinder. Because piston rod 27 is coupled shank 24 of the roller mount through sleeve 26, and the position of cylinder 28 is fixed relative to the mower frame, the entire roller assembly is pushed downwardly. As shown by comparison of FIGS. 3 and 4, this has the effect of elevating the mower frame, pivoting on the axis of front roller 20. Sleeve 26 functions as a stop to limit relative movement of the roller assembly and mower frame.

Because the cutting edge of bed plate 14 is approximately midway between the forward and rear rollers, the extent of relative movement between the rear roller assembly and frame is approximately double the desired change is cutting height. For example, if the grass on the greens is cut to one-quarter inch height and it is desired that the grass on the collar to be cut to one-half inch height, then the distance shank 24 is permitted to reciprocate in passage 25, as determined by the stops, is one-half inch. All of the cylinders are actuated instantly and simultaneously simply by a flip of the switch on the steering column. To return the mower to the lower cutting height, the switch is merely flipped off to turn off the compressor and vent the air. The tension of spring 50 in each cylinder and the weight of the mower frames serve to simultaneously and instantly return the mowers to their normal greens cutting position.

A transversely extending rotating brush 53 is journaled in a pair of mounting brackets 54 suspended from the rear ends of frame side members 12L and 12R. The brush is rotated by means of a belt 55 driven from a sheave 56 secured to reel sheave 19 for rotation therewith. Belt 55 engages brush pulley 57. Tension on the belt is maintained by means of a tensioning pulley 58 biased upwardly by spring 59. Brush 53 functions to prevent buildup of grass clippings on roller 22.

The improved golf greens mower according to the present invention permits two-stage accurate instantaneous and simultaneous shifting adjustment of the cutting height of the plural mower units with minimum effort on the part of the operator. The cutting heights are precisely and accurately predetermined by positioning of the stop members 26 and 47. This may be done in the factory or shop according to the preferences and desires of the greenskeeper. No adjustment of the cutting height, apart from the predetermined cutting green and collar cutting heights, is necessary or desirable out on the course.

Although, for convenience, on the illustrated greens mower the height adjustment is made through the rear roller, the same effect can be achieved by keeping the rear roller stationary and providing two-stage adjustment of the forward roller. Instead of having a shank extending through a vertical passage within the frame end members as illustrated, the reciprocable roller may be mounted in vertically slideable brackets movably secured to one face of the end members, in the manner of the aforesaid Bartlett patent.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. In a power driven tractor type riding golf greens mower having a plurality of reel mowing units, each mowing unit having a frame including a pair of parallel spaced apart longitudinally extending end members and supporting a transversely extending, rotatable grass cutting reel and bed plate and a pair of parallel rotary ground engaging means disposed forwardly and rearwardly of the reel, the improvement which consists of a cutting height adjustment on each mowing unit comprising:
- A. a pair of spaced apart mounting brackets for one of said rotary ground engaging means fixedly secured to said frame end members,
- B. a pair of spaced apart support assemblies for the other of said rotary ground engaging means secured to said frame end members for reciprocable vertical movement relative to the frame,
- C. a pair of fluid pressure cylinders fixedly secured to said frame above said reciprocable support assemblies, the pistons thereof secured to said support assemblies,
- D. a pair of stop means for limiting reciprocable movement of each of said reciprocable support assemblies,
- E. a common source of fluid pressure,
- F. conduit means connecting said source of fluid pressure to each of said cylinders, and
- G. control means regulating flow of fluid through said conduits.

2. A mower according to claim 1 further characterized in that:
- A. said source of fluid pressure comprises an electrically operated air compressor and tank, and
- B. said conduit means includes a first distributor fitting, a separate conduit to each mowing unit, a further distributor fitting mounted on each mowing unit and a separate conduit to each cylinder.

3. A mower according to claim 2 further characterized in that said control means comprises a swtich controlling the electrical circuit to said compressor.

4. A mower according to claim 1 further characterized in that:
- A. each of said reciprocable support assemblies includes a vertically extending shank, and
- B. the upper end of said shank is rigidly secured to the piston rod of one of said cylinders.

5. A mower according to claim 4 further characterized in that said shank is in axial alignment with said piston rod.

6. A mower according to claim 4 further characterized in that:
- A. said frame end members each include a generally vertical passage adjacent one end thereof,
- B. said support assemblies shank extends through said passage for reciprocal movement therein, and
- C. said stop means are mounted on said shank above and below the ends of said passage.

7. A mower according to claim 6 further characterized in that:
- A. said shank is threaded through at least part of its length,
- B. one of said stop means is a nut on the threaded portion of said shank, and
- C. the other of said stop means is a sleeve coupling the ends of the shank and piston rod.

8. A mower according to claim 1 further characterized in that the ground engaging means supported in said reciprocable support assemblies is disposed rearwardly of the reel.

* * * * *

UNITED STATES PATENT AND TRADEMARK OFFICE
CERTIFICATE OF CORRECTION

PATENT NO. : 4,021,996
DATED : May 10, 1977
INVENTOR(S) : Gordon E. Bartlett et al It is certified that error appears in the above-identified patent and that said Letters Patent are hereby corrected as shown below:

Column 3, line 68, after "coupled" --to-- is omitted.

Column 4, line 13, "is" should be --in--.

Column 4, line 15, after "collar", "to" should be omitted.

Column 6, Claim 6, subparagraph B, line 1, "assemblies" should be --assembly--.

Signed and Sealed this ninth Day of August 1977

[SEAL]

Attest:

RUTH C. MASON
Attesting Officer

C. MARSHALL DANN
Commissioner of Patents and Trademarks